United States Patent [19]

Osborn et al.

[11] Patent Number: 5,490,434
[45] Date of Patent: Feb. 13, 1996

[54] VEHICLE TRANSFER CASE SHIFTER SYSTEM

[75] Inventors: Charles Osborn, Spring Lake; Robert M. Medema, Muskegon, both of Mich.

[73] Assignee: Grand Haven Stamped Products, Grand Haven, Mich.

[21] Appl. No.: 188,561

[22] Filed: Jan. 28, 1994

[51] Int. Cl.$^6$ ................................................. B60K 23/08
[52] U.S. Cl. ............................ 74/475; 74/473 R; 74/501.6
[58] Field of Search ................................ 74/473 R, 475, 74/501.6

[56] References Cited

U.S. PATENT DOCUMENTS

| | | | |
|---|---|---|---|
| 2,961,890 | 11/1960 | Marshall | 74/477 |
| 3,413,870 | 12/1968 | Spease, Jr. | 74/475 |
| 3,491,612 | 1/1970 | Adahan | 74/473 |
| 3,643,528 | 2/1972 | van der Loos | 74/475 |
| 3,765,261 | 10/1973 | Hobbins | 74/477 |
| 3,779,096 | 12/1973 | Hurst et al. | 74/476 |
| 3,902,378 | 9/1975 | Osborn | 74/475 |
| 3,994,184 | 11/1976 | Osborn | 74/475 |
| 4,022,078 | 5/1977 | Malott | 74/475 |
| 4,126,054 | 11/1978 | Langford et al. | 74/475 |
| 4,191,064 | 3/1980 | Houk et al. | 74/475 |
| 4,474,085 | 10/1984 | DeVogelaere et al. | 74/475 |
| 4,989,473 | 2/1991 | McMorris | 74/475 |
| 5,249,478 | 10/1993 | Moroto et al. | 74/475 |

FOREIGN PATENT DOCUMENTS

| | | | |
|---|---|---|---|
| 186573A | 7/1986 | European Pat. Off. | 74/475 |
| 448348A | 9/1991 | European Pat. Off. | 74/475 |
| 501498 | 3/1939 | Germany . | |
| 2317593 | 4/1973 | Germany | 74/473 R |
| 0035921 | 3/1979 | Japan | 74/475 |

*Primary Examiner*—Rodney H. Bonck
*Assistant Examiner*—David Fenstermacher

[57] ABSTRACT

A vehicle transfer case shifter system including a shifter mechanism with a cable actuator for actuating the pivot arm of a transfer case. The shifter mechanism includes two plates, one connected to the shifter handle and the other to the cable. The one plate is vertically slidable relative to the other plate and uniquely coupled to the other plate.

16 Claims, 6 Drawing Sheets

VEHICLE TRANSFER CASE SHIFTER SYSTEM

This invention relates to a transfer case shifter system for a 4-wheel drive vehicle in which the drive trains of the vehicle provide driving torque to all four wheels of the vehicle. More specifically, this invention relates to a shift lever assembly for shifting a transfer case into one of four modes which are: 2-wheel, high; 4-wheel, high; neutral; and 4-wheel, low.

BACKGROUND OF THE INVENTION

It is well known that shifting of 4-wheel drive vehicles is accomplished by the actuation of a single pivot arm extending outwardly from the transfer case housing and to which is attached one end of a selector rod, the other end of the rod being connected to an arm actuator which is a part of a vehicle shift lever assembly mounted directly on the transfer case housing. The vehicle shift lever assembly includes a shift lever which extends upwardly into the driver's compartment, much like the conventional floor shift lever which extends from the vehicle's primary transmission.

Problems have arisen in that frequently, the transfer case is not mounted directly under the place in file vehicle where the shift lever is to be located. In fact, it has been suggested that the shifter mechanism be mounted to the floor pan rather than on the transmission. Thus, the geometry of the shifter parts have to be changed for every different position of the transfer case relative to the shifter mechanism. Accordingly, the change in the geometry of the shifter requires a change in a number of the parts of the shifter. This creates the problem of having to inventory a large number of parts for each shifter so as to accommodate the relative different positions of the transfer case with respect to the shifter assembly.

In any shifter or transmission control mechanism, it is desirable to provide as simple an operating mechanism as possible. Many different shifters have been designed to provide a straight line shifter, that is, one in which it is not necessary to move the shift lever transversely of the forward and rearward direction for shifting the transmission to the various modes as referred to above. Two such examples of shifters of this type are shown in U.S. Pat. No. 2,961,890 issued to Marshall and U.S. Pat. No. 3,765,261 issued to Robbins. These two patents disclose shifters mounted on a transfer case housing. Further, such shifters are very complicated and cumbersome, thus lacking the simplicity which has been a long-felt need in the industry. In addition, the shifting mechanism includes actuator rods which lack the flexibility and advantages of the present invention.

SUMMARY OF THE INVENTION

The present invention provides for the combination of a transfer case and transfer case shifter mechanism in which the transfer case has the conventional pivot arm operatively connected to the changeable gearing within the transfer case housing to achieve 2-wheel, high; 4-wheel, high; neutral; and 4-wheel low. The shifter mechanism is operatively connected to this pivot arm for actuating the same by means of a cable having two ends, one connected at one of the ends to the pivot arm and the other of the ends to the shifter mechanism. The combination also includes direction changing means such as pulleys or the like provided to change the direction the cable is extended. As a result, the same shifter mechanism can be utilized without changing the geometry of the parts of the shifter mechanism for shifting the gears of the transfer case regardless of the relative positions of the shifter assembly and transfer case. For example, the shifter mechanism can be mounted on the floor pan rather than on the transfer case housing and the transfer case can be mounted forwardly or rearwardly of the shifter assembly. Thus, the requirement for a large number of different parts, as required on present-day shifters, is eliminated. One shifter assembly can fit all transfer cases, the only change required is the looping of the cable and providing cable pulleys or the like to change the direction of the cable.

The transfer case shifter mechanism of this invention is uncomplicated. It includes a shift lever having a first lever plate with a handle extending upwardly from its upper end. A detent pin is connected to the lower end of the first lever plate for extending into a detent groove. A shift lever plate pivotally mounted at its upper end has connecting means for connection to a cable for transmitting the pivotal movement of the shift lever plate to the gears of the transfer case. The first lever plate is mounted for vertical sliding movement relative to the shift lever plate. A spring is directly connected to the first lever plate for biasing it upwardly relative to the shift lever plate. At the lower ends of the plates, a coupling means is provided for simultaneous pivotal movement of the handle and the plates along with the detent pin whereby the detent pin, after the first lever plate is vertically slid downwardly, can be moved from one notch representing one shifter position to another notch representing another shifter position. With the detent pin out of the notches, it is moved by pivoting of the handle to an alignment with another notch. After releasing the downward force on the handle and the first lever plate, a spring forces the detent pin upwardly into such other notch.

In one embodiment of our invention, the plates have cutout portions intermediate their ends with the spring mounted in the cutout portion so as to bias the first lever plate upwardly relative to the shift lever plate.

In another embodiment of our invention, a reverse motion lever pivoted intermediate its ends is provided. The lower end is connected to the lower end of the shift lever plate and the upper end includes a connection means for connection to a cable for transmitting the pivotal movement of the shift lever plate to the gears of a transfer case. In this second embodiment, the spring is connected to the shift lever plate and to the pivot pin about which the plates are pivoted.

Within a narrower aspect of this invention, the plates are encased within a two-piece plastic molded housing, one of the pans having a detent groove molded therein for receiving the detent pin.

It will become obvious from the following description that the transfer case shifting system and the shift lever assembly of this invention solves problems heretofore existing in the transfer case shifting art. Further, the function and other advantages of the present invention will become more apparent after considering the following detailed specification which discloses preferred embodiments therein in conjunction with the accompanying drawings wherein:

DESCRIPTION OF THE EMBODIMENT OF FIGS. 1–7

Figure 12:
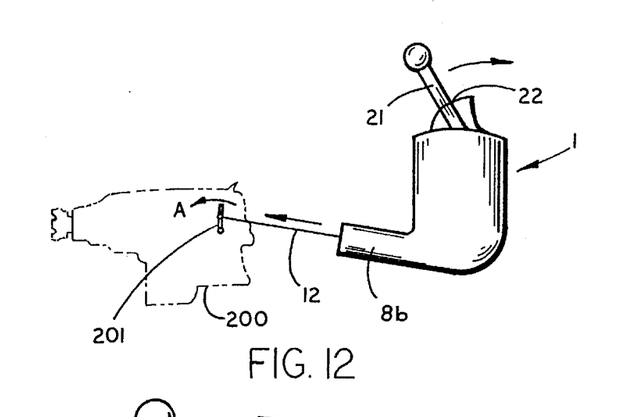
FIG. 12 is a schematic view of a combination of the shifter mechanism of FIGS. 1–8 and a transfer case.

Referring to the drawings, and more particularly by reference numeral, in all of FIGS. 1–4 and 7, reference numeral 1 designates a shifter mechanism which includes a housing 2 formed of two covers 3 and 4 between which are mounted the handle lever 20 and the shift lever 30, both of which are pivotally mounted on the bushing 6 about the pivot pin 5. As will be disclosed in greater detail hereinafter, depressing handle 21 causes the detent pin 7 to move downwardly permitting the pivoting of the handle lever 20 which, in turn, pivots the shift lever 30 to which is connected a cable 12 that shifts the gears in the transfer case 200 (FIG. 12).

Housing 2 is constructed of the two plastic covers 3 and 4 constructed of a rigid, tough plastic such as mineral-filled nylon or a polyester. Both of the covers 3 and 4 have cavities for receiving the moving parts of the shifter assembly attachment openings and include the snouts 8a and 8b extending from the housing parts of the covers 4 and 3, respectively. Snouts 8a and 8b enclose passageway 10 aligned with the cable attachment pin 11. The covers 3 and 4 each have the flanges 13 and 14, respectively, for mounting the shifter mechanism 1 on the floor pan of a vehicle. Obviously, the shape and position of the flanges 13 and 14 varies depending upon the mounting of the shifter within the vehicle.

At the lower end of cover 4 opposite detent pin 7, a detent groove 15 is provided for locking the detent pin 7 into one of several positions, namely, 2-wheel, high (2H); 4-wheel, high (4H); neutral (N); and 4-wheel, low (4L). The position of the detent pin 7 in one of these notches determines the mode in which the gears of the transfer case are selectively shifted.

Figures 7, 8A, 8B:
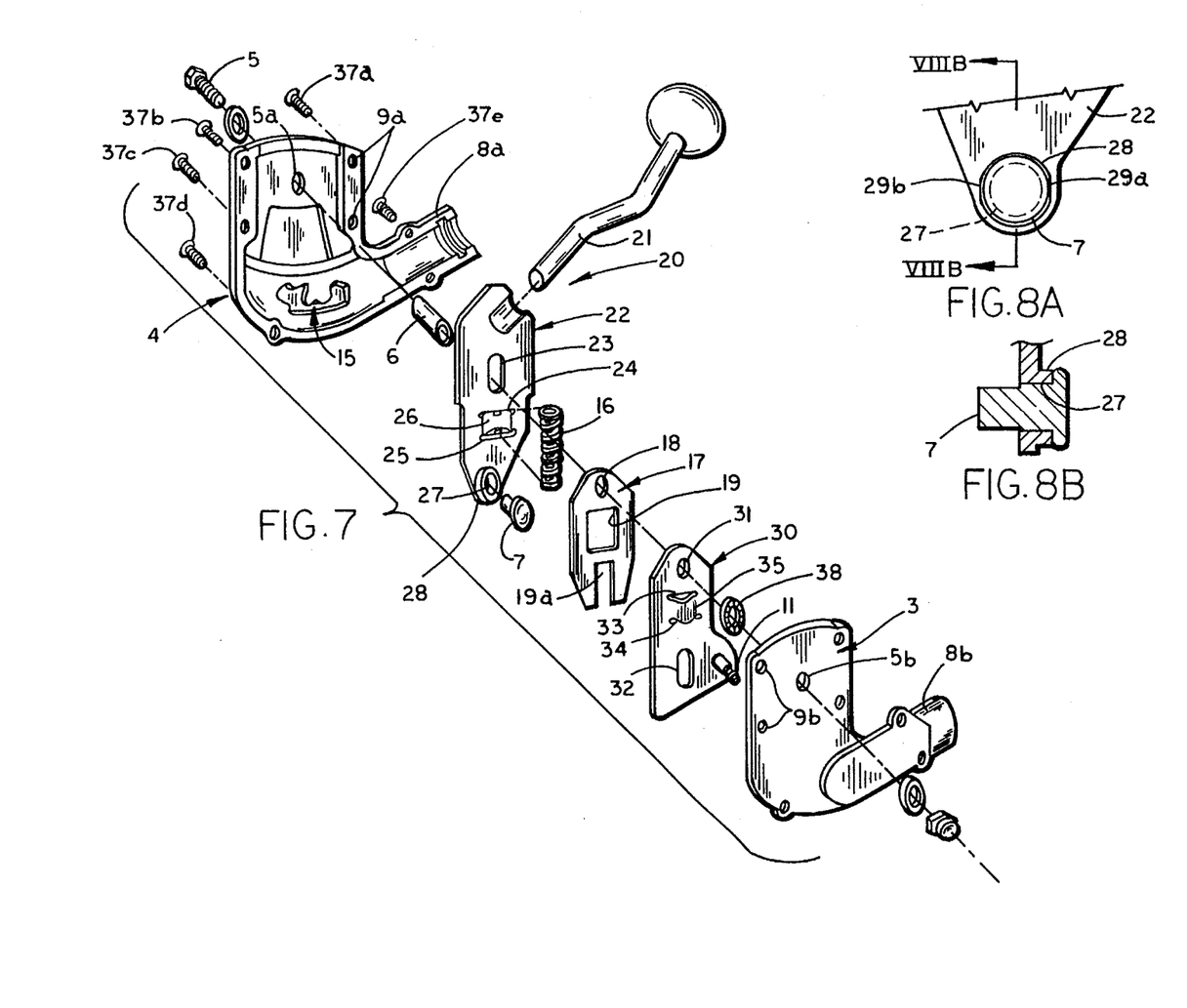
FIG. 7 is an exploded view of all the parts of the vehicle transfer case shifter of this invention.
FIG. 8A is a side-elevational view of the lower half of one of the plates with the detent pin in place.
FIG. 8B is a cross-sectional view taken along the plane VIIIB—VIIIB of FIG. 8A.

Handle lever 20 includes the handle 21 welded to the plate 22 which, as best disclosed in FIG. 7, has a vertically oriented, elongated opening 23 for receiving the pivot pin 5 and bushing 6. Opening 23 permits the vertical movement of plate 22. Openings or slits 24, 25 in plate 22 (FIG. 7) provide for a deformed portion 26 to be formed in the side of plate 22 forming a pocket for receiving spring 16 as will be explained hereinafter. Opening 27 is provided at the extreme lower end of plate 22 for receiving the detent pin 7. A flange or bushing 28 (FIGS. 8A and 8B) surrounds opening 27 and includes two flat edges 29a and 29b.

Figure 2:
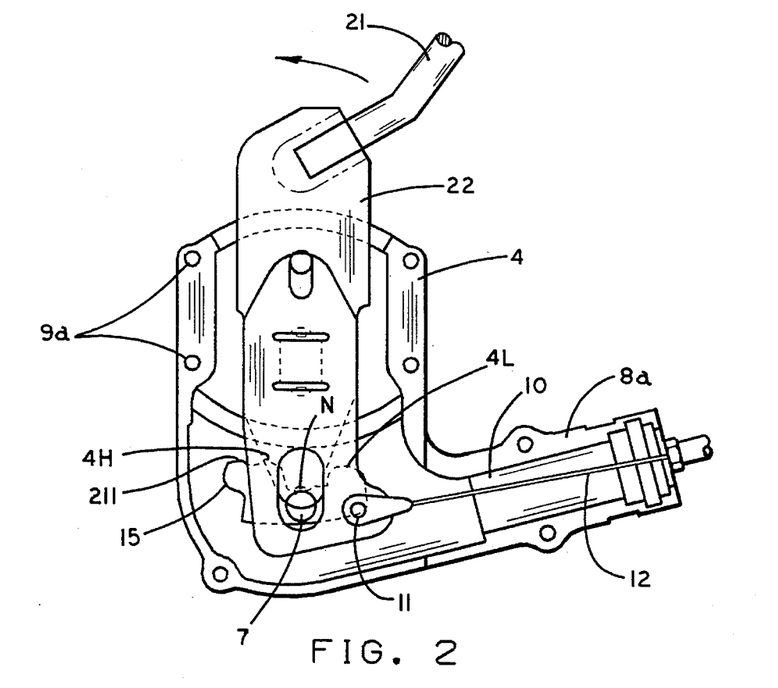
FIG. 2 is a side-elevational view of the shifter assembly of FIG. 1 with one cover removed and illustrating the neutral position of the shifter.
Figure 3:
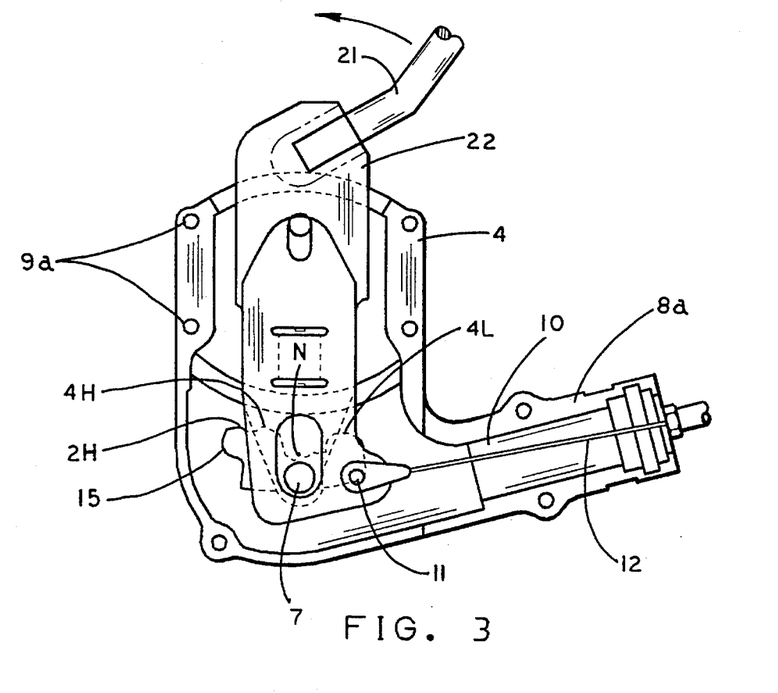
FIG. 3 is a side-elevational view like that of FIG. 2 wherein the shifter is in a position with the handle depressed permitting movement of the detent pin to any one of the notches of the detent groove.

Shift lever plate 30 is an elongated plate, as best disclosed in FIGS. 2 and 7. It has an opening 31 at its upper end for receiving the pivot pin 5 and elongated vertical opening 32 is located at the lower end of plate 30 for receiving the protruding flange or bushing 28 of plate 22. Intermediate its ends, slits 33, 34 are provided to permit the deformed portion 35 which forms a pocket for the spring 16. Thus, the deformed portions 26 and 35 of plates 22 and 30, respectively, retain the spring 16 so as to provide an upwardly biasing force on plate 22. Also at the lower end of plate 30, a cable attachment pin 11 is provided.

A nylon spacer 17 is provided between the two plates 22 and 30. It includes the opening 18 for receiving the pivot pin 5, a central opening 19 for accommodating the spring 16, and slot 19a for receiving flange 28 of the plate 22. This nylon spacer prevents metal-to-metal contact between the plates 22 and 30. It is lubricous because of the nylon material from which it is made and thus facilitates the vertical sliding action of plate 22 relative to plate 30.

ASSEMBLY

Figure 1:
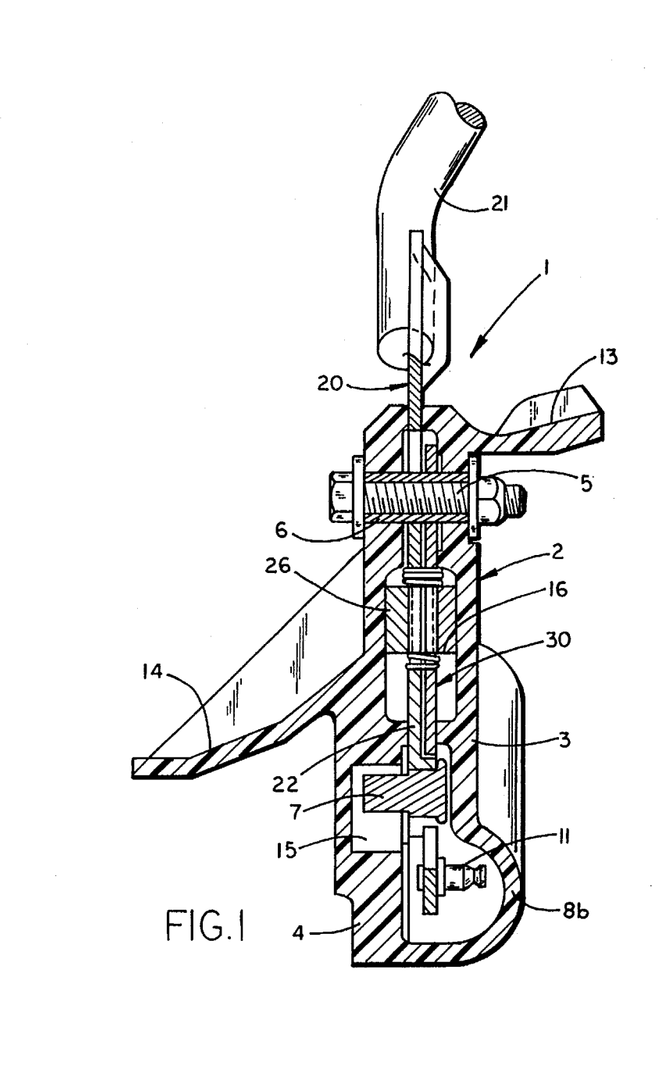
FIG. 1 is an end-elevational, cross-sectional view of one embodiment of the shift lever assembly of this invention.

Having described the major components of the shifter mechanism 1, the assembly as disclosed in FIG. 1 should be evident. The two plates 22 and 30 are placed on opposite sides of the nylon spacer 17 with the spring 16 in place in the pocket formed by the two deformed portions 26 and 35. The two covers 3 and 4 are placed on each outer side of the plates 22 and 23 and are held in place by the pivot pin 5 and the bolts 37a, 37b, 37c, 37d, and 37e. The wave washer 38 is provided between plate 30 and cover 3 for holding the plates 22 and 30 tightly together to eliminate any slop. As disclosed in FIG. 1, the detent pin 7 extends into the detent groove 15 while the flange 28 of plate 22 extends into the opening 32 of plate 30 thus coupling plate 22 to plate 30. As previously disclosed, the two plates are pivotal on the bushing 6 about the axis of the pivot pin 5. Pivot pin 5 and bushing 6 extends through the openings 5a and 5b of the covers 4 and 3, respectively.

Figures 4, 5, 6:
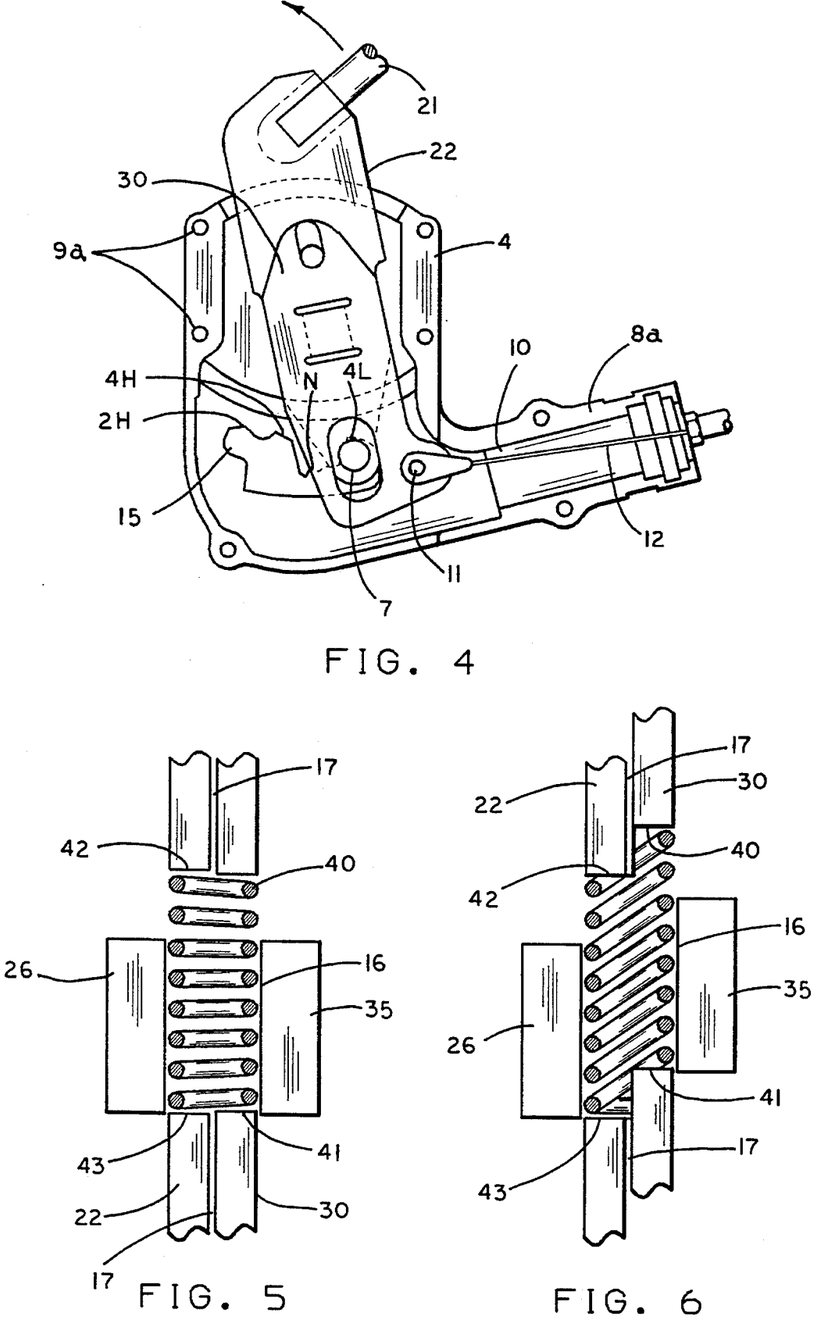
FIG. 4 is a side-elevational view like that of FIGS. 2 and 3 with the shifter in the 4-wheel, low position.
FIG. 5 is a cross section showing one relative position of pocket portions of the two plates between which a bias spring is mounted as shown in FIG. 1.
FIG. 6 is a cross-sectional view like that of FIG. 5 showing another relative position of the plates.

FIGS. 5 and 6 schematically disclose the operation of the biasing spring 16 for biasing plate 22 upwardly relative to shift lever plate 30. As disclosed in FIG. 5, which shows plate 22 biased upwardly to the upper position of FIG. 1, the coil springs engage surfaces 40 and 41 of plate 30 and surfaces 42 and 43 of plate 22, thus biasing and holding plate 22 upwardly as disclosed in FIG. 1. When handle 21 is depressed, plate 22 moves vertically downwardly causing surface 42 to compress spring 16 as disclosed in FIG. 6. Releasing handle 21 permits spring 16 to expand and exert a force on surface 42 which slides the plate 22 upwardly.

OPERATION OF THE EMBODIMENT OF FIGS. 1–7

Having described the major components of the shifter mechanism of FIGS. 1–7, its operation for actuating cable 12 should be evident. Assuming that the shifter is in the neutral position of FIG. 2 and it is desirable to shift from the "N" notch to either of the notches "4L," "4H" or "2H," the driver depresses handle 21 causing plate 22 to slide downwardly to a position out of contact with any of the notches as disclosed in FIG. 3. In this position, while depressing handle 21, it is rotated clockwise as viewed in FIGS. 2–4 to shift to 2-wheel, high (2H) or 4-wheel, high (4H). In order to shift to 4-wheel, low (4L), handle 21 is rotated counterclockwise. In the rotation of handle 21, handle lever 22 is rotated and since it is coupled to shift lever plate 30 by means of flange 28 extending through elongated opening 32, shift lever plate 30 is also rotated to an alignment with one of the notches "2H," "4H" or "4L." It should be understood that in rotating from neutral to any one of the other notches, a very slight depression of handle 21 is required. In fact, notch "N" can be very shallow so that the detent pin 7 will ride out of notch "N" with very little or no depressing of the handle. In shifting from "4H" to "2H" or visa versa, very little depressing of handle 21 is also required and, in fact, such notches could be sufficiently shallow so that the detent pin rides from one notch to the next without any direct depression by the driver. However, in shifting from either "2H" or "4H" to "4L," or visa versa, a substantial depressive force is required to be exerted on handle 21 so as to cause the detent pin 7 to move to the position of FIG. 3 where it will be free to be moved into the notch "4H," "2H" or "4L" by rotation of handle 21 in the appropriate direction.

DESCRIPTION OF THE EMBODIMENT OF FIGS. 9 AND 10

Figures 9, 11:
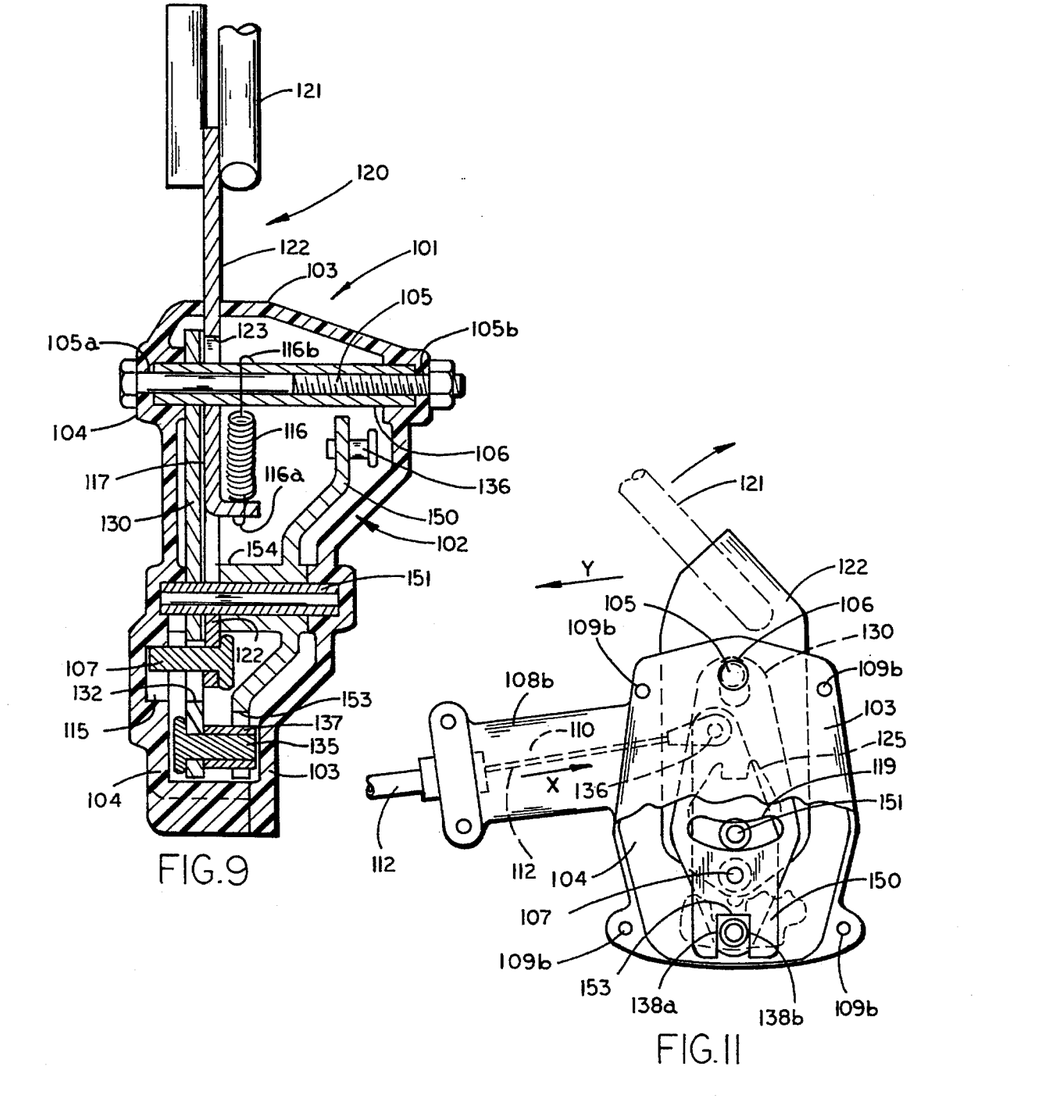
FIG. 9 is a cross-sectional end view of a second embodiment of the shifter mechanism of this invention.
FIG. 11 is a side-elevational view of the shifter mechanism of FIG. 10 partially broken away at the lower end thereof.
Figure 10:
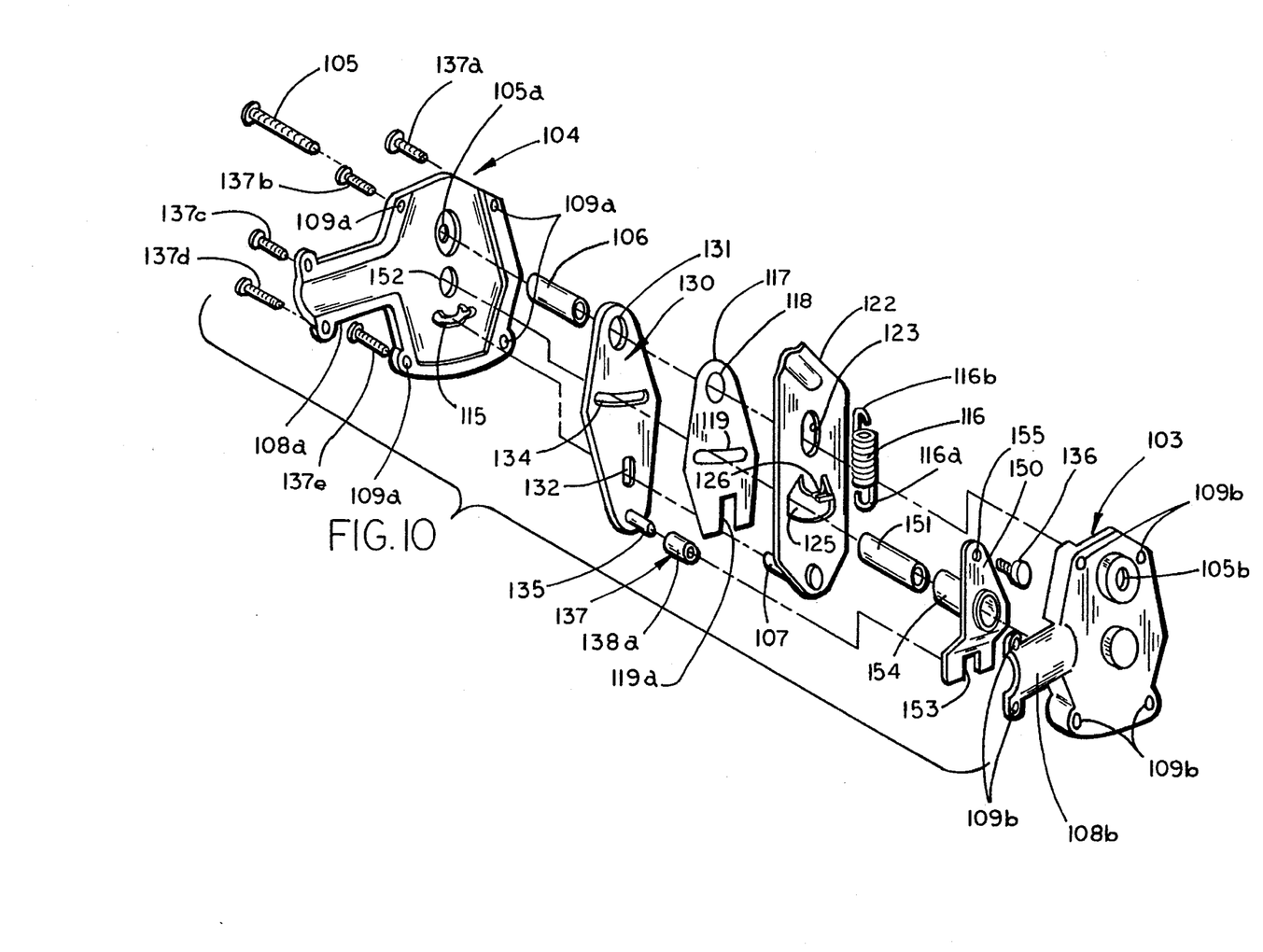
FIG. 10 is an exploded view showing all the parts of the shifter mechanism of FIG. 9.

Referring to FIGS. 9 and 10, reference numeral 101 designates a shifter mechanism very similar to the shifter mechanism 1 of FIGS. 1–7. Shifter mechanism 101 includes the housing 102 which includes the covers 103 and 104. Within the housing 102 is the handle lever 120 which includes the handle 121 and handle lever plate 122 which is coupled to the shift lever plate 130 by the detent pin 107. Nylon spacer 117 having opening 118 and slots 119 and 119a is located between plates 122 and 130. The plates 122 and 130 and spacer 117 are pivoted about the pivot pin 105 and bushing 106. The plate 122 is vertically slidable relative to the shift lever plate 130 and is biased to an upward position by the spring 116. The major difference between shifter mechanism 101 and shifter mechanism 1 is the provision for a reverse motion lever 150 which is pivoted about the pivot pin 151 extending between and supported by the covers 103 and 104. This reverse motion lever 150 reverses the direction the rotational motion of the handle 121 exerts on cable 112 which is a decided advantage when the transfer case is located in certain positions relative to the shifter mechanism as will be described hereinafter.

Referring more specifically to FIG. 10, it will be noted that the covers 103 and 104 are very similar to the covers 3 and 4 as disclosed in FIG. 7. Thus, cover 103 includes the snout 108b, the opening 105b for receiving the pivot pin 105, and bushing 106. Cover 103 also includes the openings 109b for receiving the bolts 137a, 137b, 137c, 137d, and 137e.

Cover 104 is also very similar to cover 4 of FIG. 7 in that it includes the snout 108a, the opening 105a, and the openings 109a. It also includes the detent groove 115. In addition, cover 104 includes the circular recess 152 for receiving the pivot pin 151 that rotatably supports the reverse motion lever 150.

The handle lever plate 122 has a vertical, elongated opening 123 for receiving pivot pin 105 and bushing 106 which permits vertical movement of plate 122 relative to plate 130. An additional opening 125 is provided in approximately the center of plate 122 for receiving the pivot pin 151. Opening 125 is sufficiently wide to permit pivoting of plate 122 relative to pivot pin 151. Struck out of the opening 125 is the flange 126 to which one end 116a of spring 116 is connected, the other end 116b being connected to pivot pin 105 and bushing 106 (FIG. 9). Detent pin 107 extends from the lowermost end of plate 122 through opening 132 for engagement within detent groove 115.

Shift lever plate 130 includes an opening 131 for receiving pivot pin 105 and bushing 106 about which it is rotatable. It also includes a horizontally oriented, elongated, arcuate slot 134 for receiving the pivot pin 151 and the vertically extending slot 132 for receiving the detent pin 107. An actuating pin 135, having a bushing 137 mounted thereon, extends from the lower end of plate 131 toward the cover 103. Bushing 137 has vertical straight sides 138a and 138b for the purpose of sliding on the vertical edges of slot 153 of the reverse motion lever which will now be described.

Reverse motion lever 150 includes a member having a lower bent end and an upper straight end between which is located a hollow hub 154 for receiving the pivot pin 151. The hub 154 extends through opening 125 of plate 122, slot 119 of spacer 117, and slot 134 of plate 130 thus capturing both plates 122 and 130 and spacer 117 between it and the cover 104. A cable attachment pin 136 is secured in the opening 155 at the uppermost end of the reverse motion lever 150.

ASSEMBLY OF THE EMBODIMENT OF FIGS. 9 AND 10

Having described the major components of the embodiment of the shifter mechanism of FIGS. 9 and 10, the assembly as disclosed in FIG. 9 should be evident. The two plates 122 and 123 are arranged on each side of the nylon spacer 117. The pivot pin 151 is inserted through openings 125 and 134 and hub 154 is placed over the pin. The two covers 103 and 104 are mounted on each side of the plates 130 and 150. With the pivot pin 105 and bushing 106 in place spring 116 is hooked onto flange 126 and over bushing 106. As assembled, detent pin 107 extends through opening 132 of plate 130 and into detent groove 115. Actuator pin 135 and its bushing 137 extends into the slot 153. Thus, plate 122 is coupled to plate 130 through the detent pin 107 and plate 130 is coupled to reverse motion lever 150 by the actuating pin 135 and its bushing 137. The assembly is held together by pivot pin 105 and bolts 137a–e.

OPERATION OF THE EMBODIMENT OF FIGS. 9 AND 10

Having described the various components of shifter mechanism 101 and its assembly, and having described the operation of the mechanism as disclosed in FIGS. 1–7, the operation of the shifter mechanism 101 should be evident. As viewed in FIG. 11, rotation of handle 121 in a clockwise direction creates a pull on the cable 110 in the direction "X" that is the same direction as the movement of the handle 121. It will be noted as compared with the shifter mechanism 1 of FIGS. 1–7 as illustrated in FIG. 2, the rotation of handle 21 in a clockwise direction creates a pull on cable 10 in the opposite direction of the movement of handle 21. This difference is important in that a selection of one of the two shifter mechanisms 1 or 101 depends upon the location of the transfer case 200.

FIGS. 12 AND 13

Figure 13:
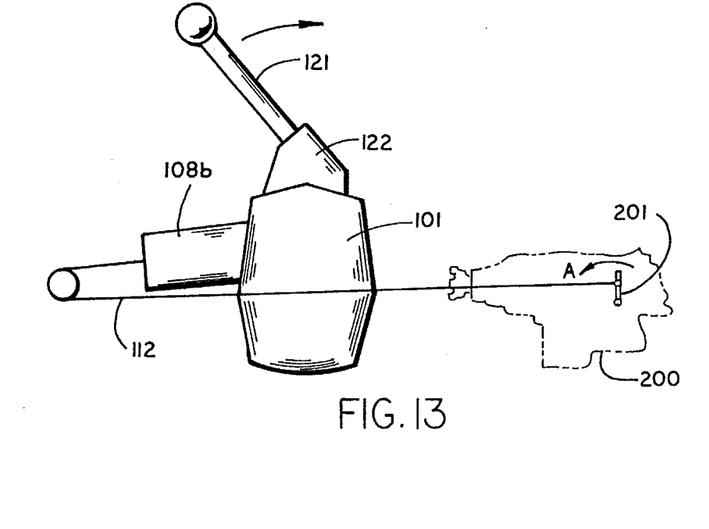
FIG. 13 is a schematic view of a combination of the shifter mechanism of FIGS. 9–11 and a transfer case.

As previously referred to in the BACKGROUND OF THE INVENTION, the separation of a transfer case from its shifting mechanism has created the geometry problem concerning the relationship of all the parts of the shifting mechanism and the gear train of the transfer case. Such problem has required a change in the shape and arrangement of the shifter parts resulting in a requirement for enormous inventory of parts. FIGS. 12 and 13 illustrate novel arrangements which eliminate such requirement, the illustration being only examples.

As disclosed in FIG. 12, shifter mechanism 1 is mounted on the floor pan above the transfer case 200, and the pivot arm 201 of the transfer case is located behind the shifter mechanism 1 assuming the vehicle is moving to the left as depicted by the arrow "Y" in FIG. 12, rotation of handle 121 in a clockwise direction will cause rotation of the pivot arm 201 of the transfer case 200 in a counterclockwise direction "A." As disclosed in FIG. 12, pivot arm 201 extends upwardly.

However, assuming for instance that because of ground clearance or perhaps a frame cross member the cable could not be attached to the bottom side of the transfer case lever as disclosed in FIG. 13, shifter 101 could be used whereby the cable 112 is attached to the top end of pivot arm 201 and still provide the correct rotation to the transfer case pivot arm 201.

Another condition in which it is advantageous to have the option of selecting one of the shifters 1 or 101 is dictated by the advisability to have the cable in a condition of tension when the transfer case requires the highest shift effort. In the application shown, the highest shifting effort is shifting out of 4L toward neutral so the cable is in tension (pulled). If the highest effort was shifting into 4L, then shifter 101 may be the best functional choice.

Considering all of the above examples in the use of shifter 1, rotation of the handle 21 results in the pushing or pulling of the cable 112 and the resultant rotation of the pivot arm 201 of transfer case 200 in desired directions as illustrated by FIG. 12. In the use of shifter 101, rotation of handle 121 in the same directions results in the pulling or pushing of the cable in a reverse direction to that of shifter 1 so as to rotate pivot arm 201 of transfer case 200 in the same desired directions as FIG. 12 as illustrated by FIG. 13.

Having disclosed the preferred embodiments of our invention, it should be understood that many changes, modifications, variations or other uses and applications of the shift lever assembly will become apparent to those skilled in the art after considering this specification and the accompanying drawings. All such changes, modifications, alterations, and other uses and applications, which do not depart from the spirit and scope of the invention, are deemed to be covered by the following claims.

The embodiments of the invention in which an exclusive property or privilege is claimed are defined as follows:

1. A transfer case shifter mechanism comprising a shift lever and a detent means having a detent groove located therein, said detent groove having a plurality of notches including at least a first notch and a second notch, each notch representing a different shifter position, said notches adapted for separately receiving a detent pin;

said shift lever including a first lever plate having a handle extending from its upper end;

a detent pin connected to the lower end of said first lever plate and extending transversely thereof into said detent groove;

a shift lever plate pivotable at its upper end about a pivot member located on an axis fixed with respect to said detent groove and having connecting means for connection to means for transmitting the pivotal movement of said shift lever plate to the gears of a transfer case;

said first lever plate being mounted for vertical sliding movement relative to said shift lever plate by means of a slot at its upper end for receiving said pivot member;

a spring directly connected to said first lever plate and biasing said first lever plate upwardly relative to said shift lever plate; and coupling means at the lower ends of said first lever plate and shift lever plate for providing simultaneous pivotal movement of said handle, said first lever plate with said detent pin and said shift lever plate about said axis whereby said detent pin can be moved from said first notch representing one of said shifter positions to said second notch representing another of said shifter positions upon applying a downward force on said handle against the bias of said spring to move said detent pin out of said first notch, applying a pivoting force to said handle to align said detent pin with said second notch, and releasing said downward force permitting said detent pin to enter said second notch.

2. The transfer case shifter mechanism of claim 1 in which said first lever plate and shift lever plate each include cutout portions intermediate their ends, said cutout portion of said first lever plate opposing said cutout portion of said shift lever plate, said spring mounted in said cutout portions so as to bias said first lever plate upwardly relative to said shift lever plate.

3. The transfer case shifter of claim 2 in which between said cutout portions of said first lever plate a bent plate portion extends in a direction away from the said shift lever plate and between said cutout portions of said shift lever plate a bent plate portion extends in a direction from said first lever plate; said spring being captured between said bent plate portions.

4. The transfer case shifter of claim 3 in which said first lever plate and shift lever plate are encased within a two-piece molded plastic housing and said detent groove is molded in one of said pieces of said plastic housing.

5. The transfer case shifter of claim 2 in which said first lever plate and shift lever plate are encased within a two-piece molded plastic housing and said detent groove is molded in one of said pieces of said plastic housing.

6. The transfer case shifter of claim 1 in which said first lever plate and shift lever plate are encased within a two-piece molded plastic housing and said detent groove is molded in one of said pieces of said plastic housing.

7. The transfer case shifter of claim 1 in which the means for providing simultaneous pivotal movement of said handle, first lever plate, and shift lever plate includes said first lever plate having a first face and an opposite second face, said detent pin extending from said first face; a protruding means extending from said second face; said shift lever plate being located on the side of said second face of said first lever plate and having an elongated opening receiving said protruding means for guiding said vertical sliding movement of said first lever plate.

8. The transfer case shifter mechanism of claim 7 in which said elongated opening has parallel vertical edges and said protrusion means has parallel vertical sides that ride along said vertical edges.

9. The transfer case shifter mechanism of claim 1 in which a lubricous film member is located between said first lever plate and shift lever plate.

10. The transfer case shifter of claim 1 in which a cable is attached to said connecting means for transmitting the pivotal movement of said shift lever plate to the gears of a transfer case.

11. The transfer case shifter of claim 10 in which direction changing means is provided to change the direction said cable is extended whereby transfer cases located at different positions relative to said shifter mechanism can be shifted without changing the geometry of the parts of said shifter mechanism.

12. The transfer case shifter mechanism of claim 1 in which a pivoted reverse motion lever is provided, said reverse motion lever pivoted about an axis located between its lower end and upper end, said lower end connected to said connecting means of said shift lever plate, said upper end having a second connecting means for connection to means for transmitting the pivotal movement of said shift lever plate to the gears of a transfer case.

13. The transfer case shifter of claim 12 in which said first lever plate is located on the opposite side of said shift lever plate from said detent groove and said detent pin extends through a vertical elongated opening in said shift lever plate and into said detent groove.

14. The transfer case shifter of claim 12 in which said first shift lever has a vertical elongated opening and said shifter lever plate having a substantially horizontal opening; said reverse motion lever being pivoted about a pivot pin extending through said vertical elongated opening of said first lever plate and said horizontal opening of said shift lever plate; said vertical elongated opening being shaped to permit vertical and pivotal movement of said first lever plate; said horizontal opening being shaped to permit pivotal movement of said shifter lever plate by said first lever plate.

15. The transfer case shifter of claim 12 in which a cable is attached to said second connecting means for transmitting the pivotal movement of said reverse motion lever to the differential of a transfer case and direction changing means is provided to change the direction said cable is extended whereby transfer cases located at different positions relative to said shifter mechanism can be shifted without changing the geometry of the parts of said shifter mechanism.

16. The transfer case shifter of claim 1 in which said spring is a coil spring having one end connected to said first lever plate and another end connected to said pivot member.

* * * * *

UNITED STATES PATENT AND TRADEMARK OFFICE
CERTIFICATE OF CORRECTION

PATENT NO. : 5,490,434
DATED : February 13, 1996
INVENTOR(S) : Charles (NMI) Osborn et al.

It is certified that error appears in the above-indentified patent and that said Letters Patent is hereby corrected as shown below:

Column 1, line 25;
    "file" should be --the--.

Column 2, line 49;
    "pans" should be --parts--.

Column 3, line 51;
    After "assembly" insert --,--.

Column 3, line 52;
    After "openings" insert --9a--.

Signed and Sealed this

Third Day of September, 1996

*Attest:*

BRUCE LEHMAN

*Attesting Officer     Commissioner of Patents and Trademarks*